United States Patent
Collins et al.

(10) Patent No.: US 11,399,265 B2
(45) Date of Patent: Jul. 26, 2022

(54) SYSTEMS AND METHODS FOR CONFIGURING AND TESTING AN EXTERNAL DEVICE THROUGH A MOBILE DEVICE

(71) Applicant: HITACHI VANTARA LLC, Santa Clara, CA (US)

(72) Inventors: Clifford Collins, Santa Clara, CA (US); Jesus Valenzuela, Santa Clara, CA (US); Dylan Hatula, Santa Clara, CA (US); Janine Zhu, Santa Clara, CA (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 17/415,635

(22) PCT Filed: Mar. 13, 2019

(86) PCT No.: PCT/US2019/022114
§ 371 (c)(1),
(2) Date: Jun. 17, 2021

(87) PCT Pub. No.: WO2020/185225
PCT Pub. Date: Sep. 17, 2020

(65) Prior Publication Data
US 2022/0046397 A1    Feb. 10, 2022

(51) Int. Cl.
*H04M 3/42* (2006.01)
*H04W 4/38* (2018.01)
(Continued)

(52) U.S. Cl.
CPC .............. *H04W 4/38* (2018.02); *G16Y 30/10* (2020.01); *H04L 51/046* (2013.01); *H04W 4/80* (2018.02); *H04W 12/06* (2013.01)

(58) Field of Classification Search
CPC ......... H04W 4/38; H04W 4/80; H04W 12/06; H04L 51/046; G16Y 30/10
(Continued)

(56) References Cited

U.S. PATENT DOCUMENTS 10,206,214 B2 * 2/2019 Tachibana ............. H04W 4/026
10,257,708 B1 * 4/2019 Kamkar ............ H04W 56/0015
(Continued)

FOREIGN PATENT DOCUMENTS

CN       103685195 A      3/2014
WO       2011/063300 A1   5/2011

OTHER PUBLICATIONS

International Search Report and Written Opinion for related International Application No. PCT/US2019/22114, dated Jun. 10, 2019 (5 pages).

*Primary Examiner* — Marceau Milord
(74) *Attorney, Agent, or Firm* — Procopio, Cory, Hargreaves & Savitch LLP

(57) ABSTRACT

Example implementations described herein are directed to connecting and configuring a device to be configured into an Internet of Things (IoT) system through utilizing a mobile device. The mobile device is provided with an application that will provision and commission a device to be configured into the IoT system. Through example implementations described herein, the mobile device allows for a device to be configured to be connected to an IoT system even if no network connectivity is available for the device to be configured. The mobile device also provides sensor data in real time to determine if the device to be configured is properly configured.

10 Claims, 7 Drawing Sheets

(51) Int. Cl.
*H04W 4/80* (2018.01)
*G16Y 30/10* (2020.01)
*H04L 51/046* (2022.01)
*H04W 12/06* (2021.01)

(58) Field of Classification Search
USPC ...................................................... 455/414.1
See application file for complete search history.

(56) References Cited

U.S. PATENT DOCUMENTS

| | | | |
|---|---|---|---|
| 10,693,872 B1* | 6/2020 | Larson | H04L 63/0838 |
| 2015/0141005 A1* | 5/2015 | Suryavanshi | H04W 48/16 455/434 |
| 2015/0163056 A1* | 6/2015 | Nix | H04L 63/101 380/46 |
| 2016/0309325 A1* | 10/2016 | Katou | B60R 25/24 |
| 2016/0338120 A1* | 11/2016 | Boyle | H04L 65/4015 |
| 2016/0342906 A1* | 11/2016 | Shaashua | H04L 67/12 |
| 2017/0080332 A1* | 3/2017 | Poisner | A63F 13/215 |
| 2017/0118645 A1* | 4/2017 | Zarakas | G06Q 20/321 |
| 2017/0171778 A1 | 6/2017 | Britt et al. | |
| 2017/0208540 A1* | 7/2017 | Egner | H04L 12/1403 |
| 2018/0005194 A1* | 1/2018 | Dotan-Cohen | G06F 16/90324 |
| 2018/0117446 A1* | 5/2018 | Tran | H04L 9/3236 |
| 2018/0168464 A1* | 6/2018 | Barnett, Jr. | A61B 5/6861 |
| 2018/0288813 A1* | 10/2018 | Asnis | H04L 43/10 |
| 2019/0141526 A1* | 5/2019 | Bahrami | H04L 63/083 |
| 2019/0149361 A1* | 5/2019 | Sarwar | H04L 12/66 370/254 |
| 2019/0182333 A1* | 6/2019 | Bartfai-Walcott | H04L 29/08 |
| 2019/0296967 A1* | 9/2019 | Yang | H04L 41/0893 |
| 2019/0306024 A1* | 10/2019 | Petria | H04W 4/70 |
| 2019/0361917 A1* | 11/2019 | Tran | G06Q 40/04 |
| 2020/0117690 A1* | 4/2020 | Tran | G06F 16/90332 |
| 2020/0128084 A1* | 4/2020 | Shantharam | H04W 76/30 |
| 2020/0274760 A1* | 8/2020 | Biedermann | H04L 41/0806 |
| 2020/0367056 A1* | 11/2020 | Hodge | H04W 12/77 |
| 2022/0021583 A1* | 1/2022 | Petria | H04W 4/50 |

\* cited by examiner

SYSTEMS AND METHODS FOR CONFIGURING AND TESTING AN EXTERNAL DEVICE THROUGH A MOBILE DEVICE

CROSS-REFERENCE TO RELATED APPLICATIONS

This application is a U.S. National Stage entry of PCT Application No: PCT/US2019/022114 filed Mar. 13, 2019, the contents of which are incorporated herein by reference.

BACKGROUND

Field

The present disclosure relates generally to device test and configuration, and more specifically, through systems and methods for configuring and testing an external device through mobile device.

Related Art

For devices connected to networks, such as Internet of Things (IoT) devices or other apparatuses, users may utilize such devices to process data from sensors or connect such devices to a back end. However, configuring such a device may be difficult out of the box, as network settings and configurations for the device may be complicated. Further, even if the device is configured properly, it is difficult to determine if the device is working properly if the purpose of the device is to obtain and process sensor data such as in an IoT system.

In the related art, the only way to determine if such a device is working properly or failing is to connect the device to the sensors of the IoT system and debug the processing and transmission of the data from the device. However, there can be problems with connecting the device to customer or proprietary sensors, as the sensor data may be proprietary and require a license and/or special credentials for the device before the device is allowed to connect to the sensor and obtain sensor data. Further, the device may not be permitted or capable to connect to the network or to the internet, either because the device may be in a location where such connections are not available, or because the device is in location with a secure network to which the device is not permitted to connect.

SUMMARY

Example implementations are directed to systems and methods for device setup with a mobile device, even if no network is configured for the device. Further, example implementations described herein allow a technician to test the device through the mobile device to determine if the device is working properly end to end before customer or proprietary sensors are attached to the device.

Aspects of the present disclosure include a method, which can involve connecting, through a first connection, a mobile device to a device to be configured into an Internet of Things (IoT) system, and connecting, through a second connection, the mobile device to a host server of the IoT system, the first connection and second connection being different, provisioning the device to be configured into the IoT system; providing, through the first connection, sensor data from the mobile device to the device to be configured; and providing, through an interface, validation results based on receipt of processing results of the sensor data through the first connection from the device to be configured to the mobile device.

Aspects of the present disclosure include a computer program having instructions for executing a process, the instructions involving connecting, through a first connection, a mobile device to a device to be configured into an Internet of Things (IoT) system, and connecting, through a second connection, the mobile device to a host server of the IoT system, the first connection and second connection being different, provisioning the device to be configured into the IoT system; providing, through the first connection, sensor data from the mobile device to the device to be configured; and providing, through an interface, validation results based on receipt of processing results of the sensor data through the first connection from the device to be configured to the mobile device. The computer program may be stored on a non-transitory computer readable medium for execution by one or more processors.

Aspects of the present disclosure include a system, which can involve means for connecting, through a first connection, a mobile device to a device to be configured into an Internet of Things (IoT) system, and means for connecting, through a second connection, the mobile device to a host server of the IoT system, the first connection and second connection being different, means for provisioning the device to be configured into the IoT system; means for providing, through the first connection, sensor data from the mobile device to the device to be configured; and means for providing, through an interface, validation results based on receipt of processing results of the sensor data through the first connection from the device to be configured to the mobile device.

Aspects of the present disclosure can further involve a mobile device, which can include a processor, configured to connect, through a first connection, to a device to be configured into an Internet of Things (IoT) system, and connect, through a second connection, to a host server of the IoT system, the first connection and second connection being different, provision the device to be configured into the IoT system; provide, through the first connection, sensor data to the device to be configured; and provide, through an interface, validation results based on receipt of processing results of the sensor data through the first connection from the device to be configured.

DETAILED DESCRIPTION

Figure 1:
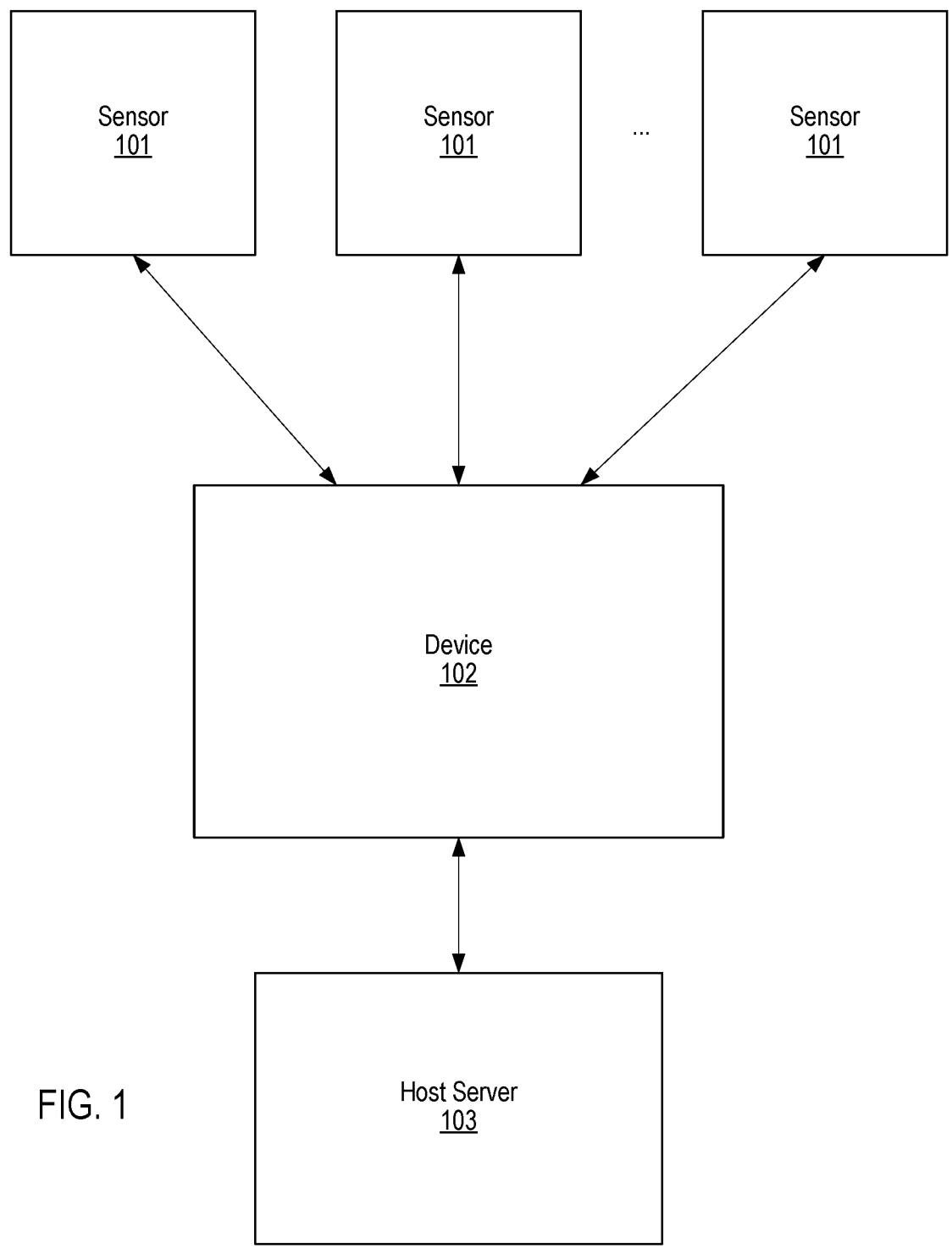
FIG. 1 illustrates an example system involving a device for processing sensor data in an IoT system, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations utilize a mobile device to configure an external device, due to several unique features provided by mobile devices. In one aspect, mobile devices can connect to a host server through using wireless connections such as cellular. Thus, even in locations where a network or internet connection is not available, the mobile device can utilize its wireless connection to tether the device or apparatus to be configured so that the device to be configured can transmit and receive data to a host server of the system through the mobile device so that the device or apparatus to be configured can be correctly provisioned.

Further, example implementations take advantage of the mobile device having Bluetooth connection capability, which allows the mobile device to connect and communicate to the device or apparatus to be configured without requiring the device or apparatus to be connected to a particular network, nor does it require the mobile device to be connected to the network. Alternatively, the mobile device may also have a wired connection available, such as Universal Serial Bus (USB) that allows the mobile device to connect to the device or apparatus to be configured directly through a wired connection.

Further, mobile devices contain several sensors, such as gyroscope, accelerometer, magnetometer, motion sensors, cameras, and so on, that allow the mobile device to simulate sensor data in an IoT system. Thus, should the device to be configured require configuration for connecting to an IoT system to facilitate the analytics or processing of sensor data, the device may not be permitted to connect to the actual sensors as the data transmitted from such sensors can involve proprietary data and/or sensitive customer data. If the device is not properly configured, then such a device should not be permitted to connect to the IoT system. In example implementations, the mobile device can utilizes its sensors to provide sensor data to the device, thereby allowing the user of the mobile device to determine whether the device is properly configured for connecting to the IoT system. In such an example implementation, the mobile device provides sensor data to the device, the device conducts processing and transmits the processed results to the mobile device through the connection, the mobile device validates the processed results, and can thereby relay the results to the host server for establishing the connection to the IoT system.

FIG. 1 illustrates an example system involving a device for processing sensor data in an IoT system, in accordance with an example implementation. In an industrial IoT system, there is a device 102 that takes in sensor readings from sensors 101, and conducts processes or analytics on the aggregated data to provide to the host server 103. For security reasons and also due to the sensitivity of the sensor data, the IoT system is maintained within a closed circle of trust. Sensor data from sensors 101 may be encrypted, and specific protocols may be utilized. For example, device 102 may use a broadcast to sensors 101 to request data in batch. Sensors 101 may also broadcast data to trusted devices in the IoT system as designated by host server 103. Host server 103 may be in the form of a cloud to facilitate functionality for the IoT system, in accordance with the desired implementation.

When a new device is to be integrated into such a system, the new device has to be correctly provisioned by the host server and properly configured for the new device to join the IoT system due to the closed circle of trust. However, it can be difficult to determine if the device is correctly provisioned or if the processes of the device are configured correctly, especially in situations in which data cannot be transmitted to the new device from proprietary sensors.

Figure 2:
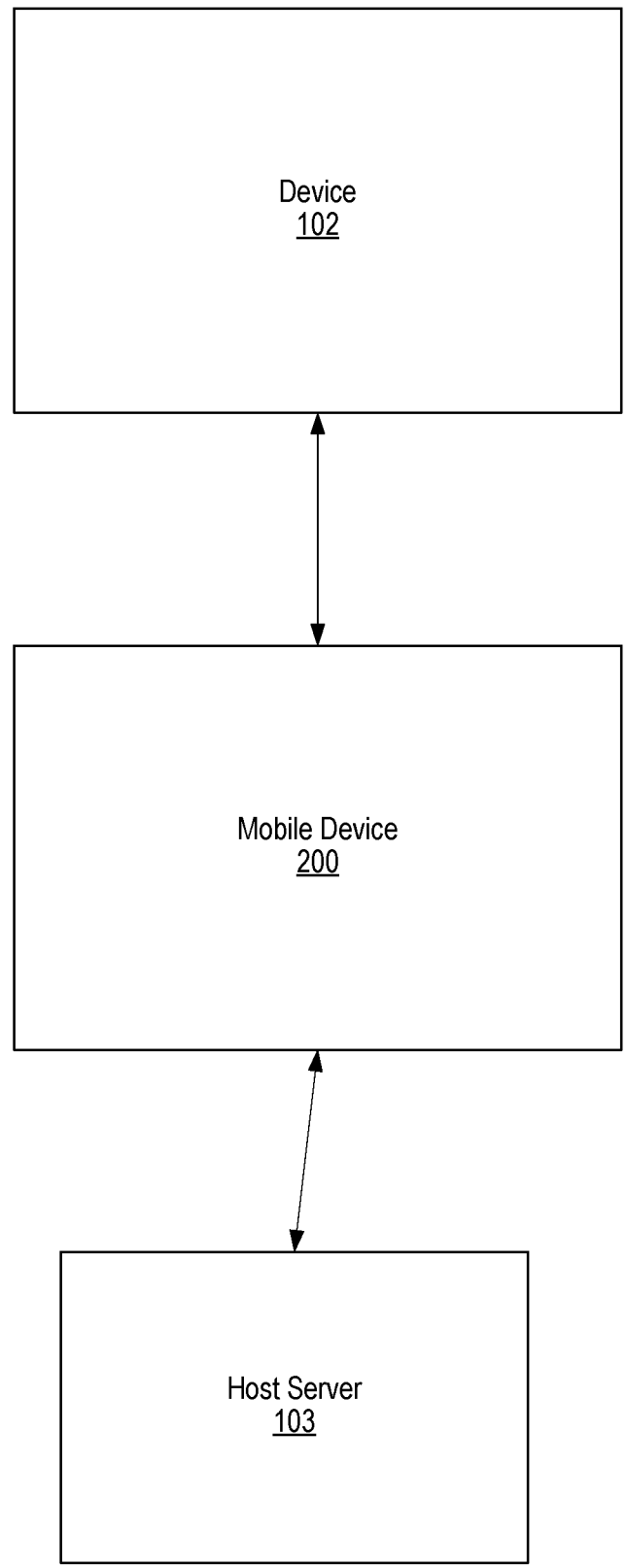
FIG. 2 illustrates an example system involving a mobile device, in accordance with an example implementation.

FIG. 2 illustrates an example system involving a mobile device, in accordance with an example implementation. In example implementations, a mobile device 200 is utilized to configure the device 102 and function as a tether between the device 102 and the host server 103. The mobile device 200 utilizes an application that works in a secure manner with devices that are not setup or configured. The mobile device application is configured to provision the device to be part of the IoT system. The application allows the technician to perform tests on the new device to determine if it is fully functional.

Figure 3:
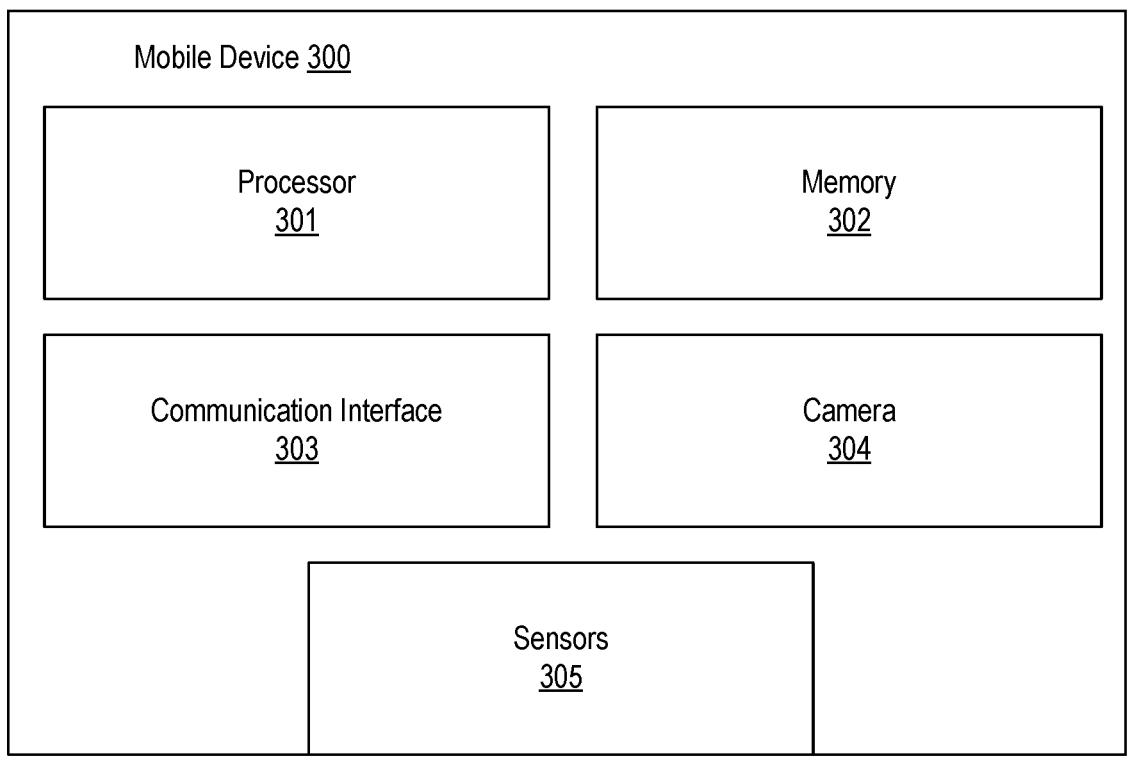
FIG. 3 illustrates an example mobile device upon which example implementations may be applied.

FIG. 3 illustrates an example mobile device upon which example implementations may be applied. Mobile device 300 may include processor 301, memory 302, communication interface 303, camera 304 and sensors 305. Memory 302 may be configured to store one or more applications, such as an application configured to connect to a device and configure the device to be provisioned into an IoT system as illustrated in FIG. 2, as well as the interfaces illustrated in FIGS. 5-7. The application can be loaded into processor 301 for execution by the mobile device. Processor 301 can be in the form of a hardware processor such as a Central Processing Unit (CPU) or some combination of hardware and software processors in accordance with an example implementation.

Camera 304 may be utilized to take images as described herein for providing images to the device to be configured or to the host server. Sensors 305 may also be configured to collect sensor data from the mobile device for providing to the device to be provisioned into an IoT system to determine if the device is correctly configured, depending on the desired implementation. For example, sensors 305 can include audio detectors (e.g. microphones) that can be utilized to detect audio. Sensors 305 may also be in the form of gyroscopes or accelerometers, to detect motion and/or the orientation of the device.

Communication interface 303 can involve one or more different protocols for conducting communications for the mobile device 300. For example, communication interface can employ Bluetooth to connect with the device to be configured, upon which processor 301 are configured to provide mobile device information so that the device to be configured can pair with the mobile device as a hotspot on the mobile device provider. After the mobile device is paired with the device to be configured, the device to be configured can thereby be configured as if they are on the same network as the mobile device. Such configurations can include setting the network interfaces of the device to be configured. For the mobile application to configure the device, the mobile device must be on the same network as the device to be configured. In order to configure devices that may be using cellular or require passwords for the local network, the mobile application is configured to use the hotspot connection facilitated by Bluetooth to configure the device. The hotspot facilitates communications between mobile device 300 and the device to be configured. In such example implementations, the device to be configured can be connected locally and securely to the mobile device, while the mobile device maintains a separate connection with the host server to maintain separation between the host server and the device to be configured.

On the back end, communication interface 303 can be configured to utilize wireless connection or cellular to connect with the host server. In particular, cellular connection allows the mobile device to connect and tether to the host device even if no internet connection or wireless connection is available.

Processor 301 can be configured to utilize two factor authentication before interaction with any device and on critical interactions with the device. In an example implementation, two factor authentication can involve utilizing biometric information (e.g., fingerprint or face scan through the mobile device) and/or a physical token for authentication/authorization. As some IoT systems may require security, two factor authorization may be utilized to ensure that authorized users are accessing the device to be configured or the host server with the mobile device.

Processor 301 may be configured to establish separate connections to the device to be configured as well as the host server. In an example implementation, the mobile device thereby behaves as a tether between the device to be configured and the host server, so that communications can be exchanged through the authenticated mobile device between the device to be configured and the host server.

In example implementations and as described with respect to FIGS. 4-7, processor 301 can be configured to connect, through a first connection, to a device to be configured into an IoT system, and connect, through a second connection, to a host server of the IoT system, the first connection and second connection being different, provision the device to be configured into the IoT system; provide, through the first connection, sensor data from the mobile device to the device to be configured; and provide, through an interface, validation results based on receipt of processing results of the sensor data through the first connection from the device to be configured.

Depending on the desired implementation and as described with respect to FIGS. 4-7, the first connection can be a Bluetooth connection and the second connection is a cellular connection. Processor 301 can be configured to obtain an authentication token from the host server through the cellular connection, and provide the authentication token to the device to be configured through the Bluetooth connection to connect the device to be configured to the IoT system. In combination with the two factor authentication system, such example implementations can ensure that only an authorized user of the mobile device can connect to the host server, and that communications to the host server are permitted when the host server provides the authentication token to the mobile device for provisioning the device to be configured.

Processor 301 can be configured to utilize provide through the first connection, the sensor data from the mobile device to the device to be configured by generating the sensor data in real time from one or more sensors 305 of the mobile device, the sensor data involving at least one of accelerometer data, camera images, gyroscope data, magnetometer data, and device-motion data as described with respect to FIGS. 4-7. In such a manner, a technician can validate in real time if the device to be configured is properly receiving and processing the sensor data.

Figure 7:
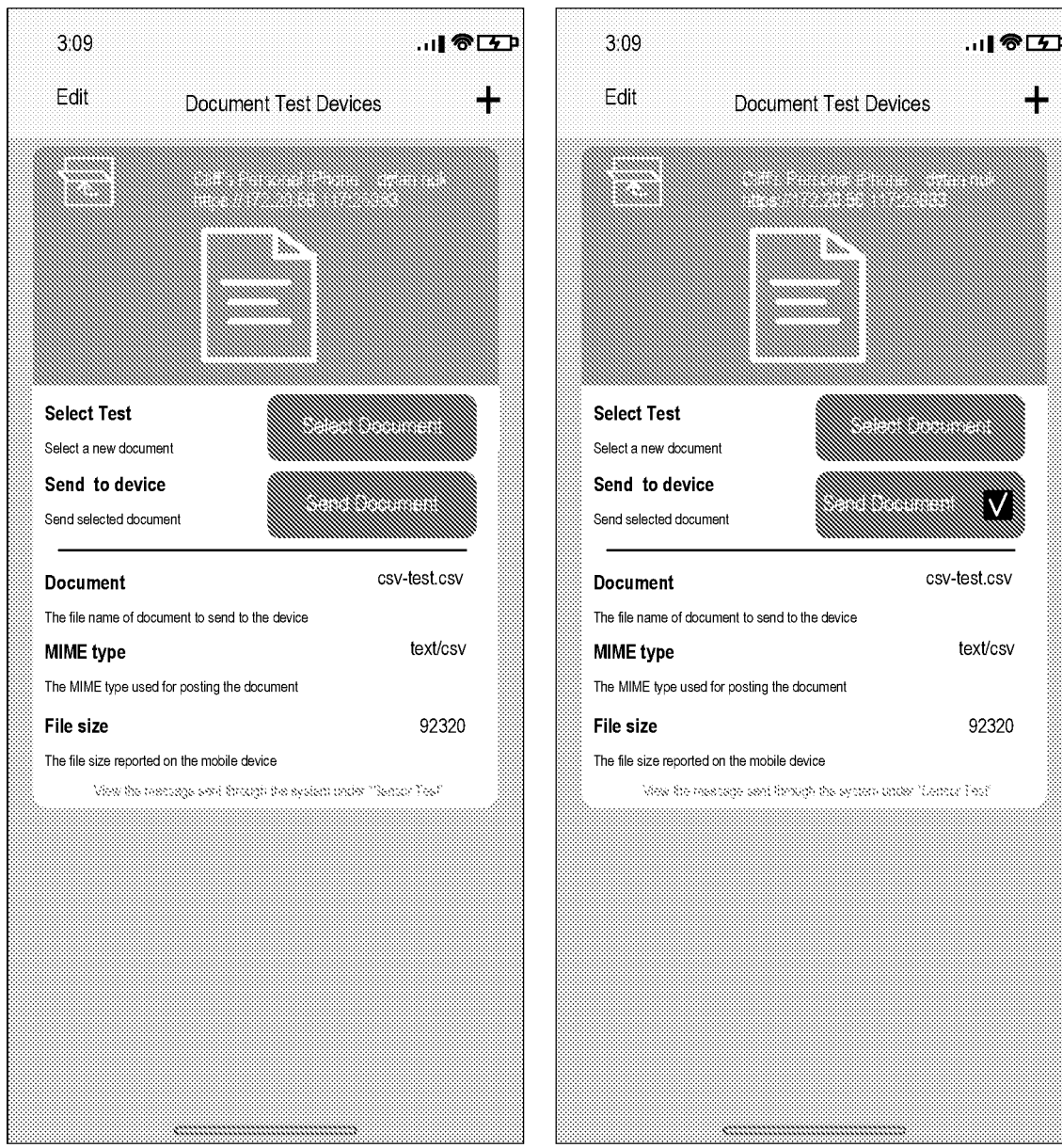
FIG. 7 illustrates an example interface in which a document can be sent to the device to be configured, in accordance with an example implementation.

In an example implementation as illustrated in FIG. 7, processor 301 can be configured to obtain one or more documents from the host server through the second connection; provide the one or more documents through the first connection to the device to be configured; and provide, through an interface, validation results based on receipt of processing results of the one or more documents through the first connection from the device to be configured to the mobile device.

Figure 5:
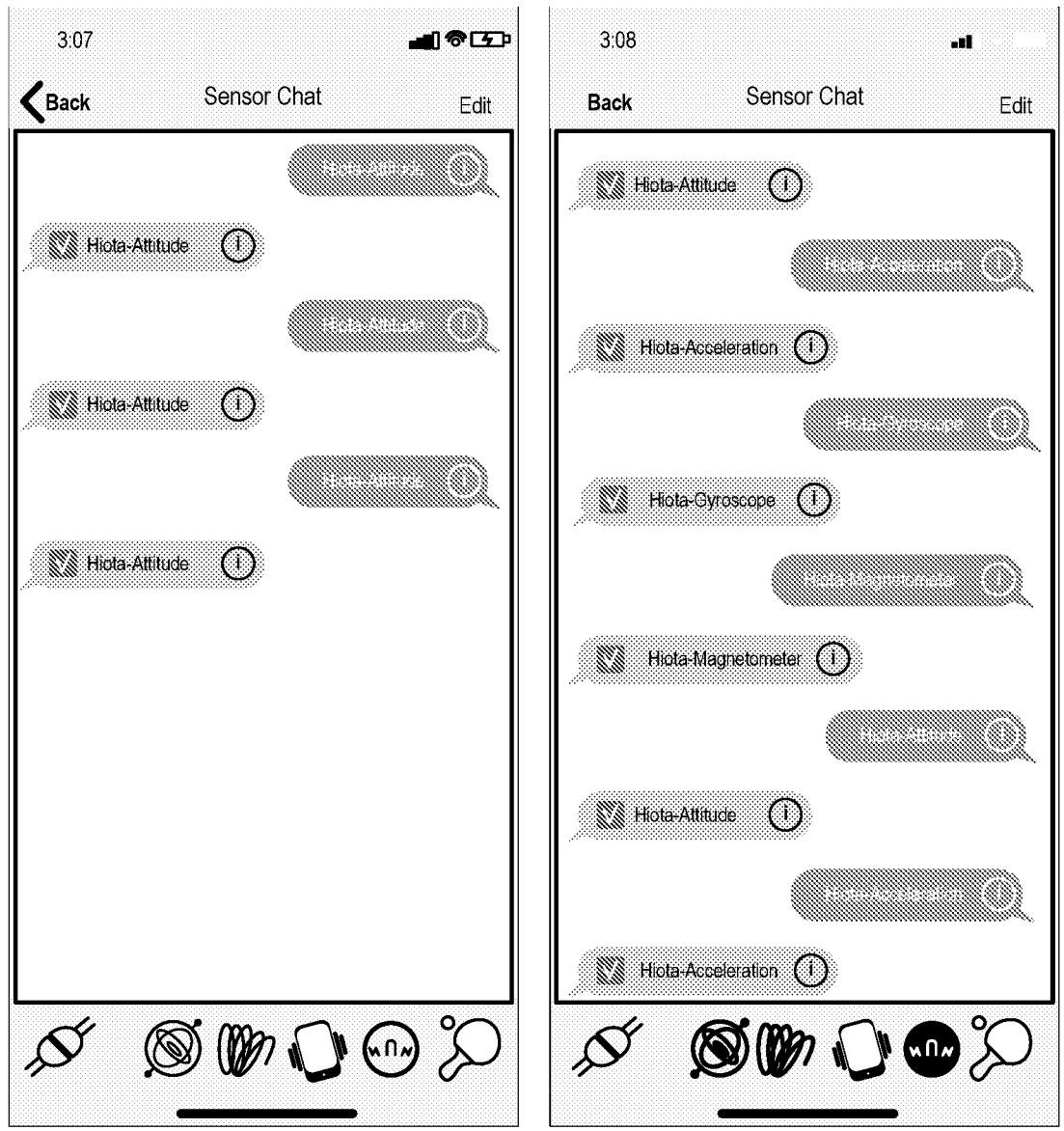
FIG. 5 illustrates an example interface for transmitting processed results to the device to be configured and receiving validation.
Figure 6:
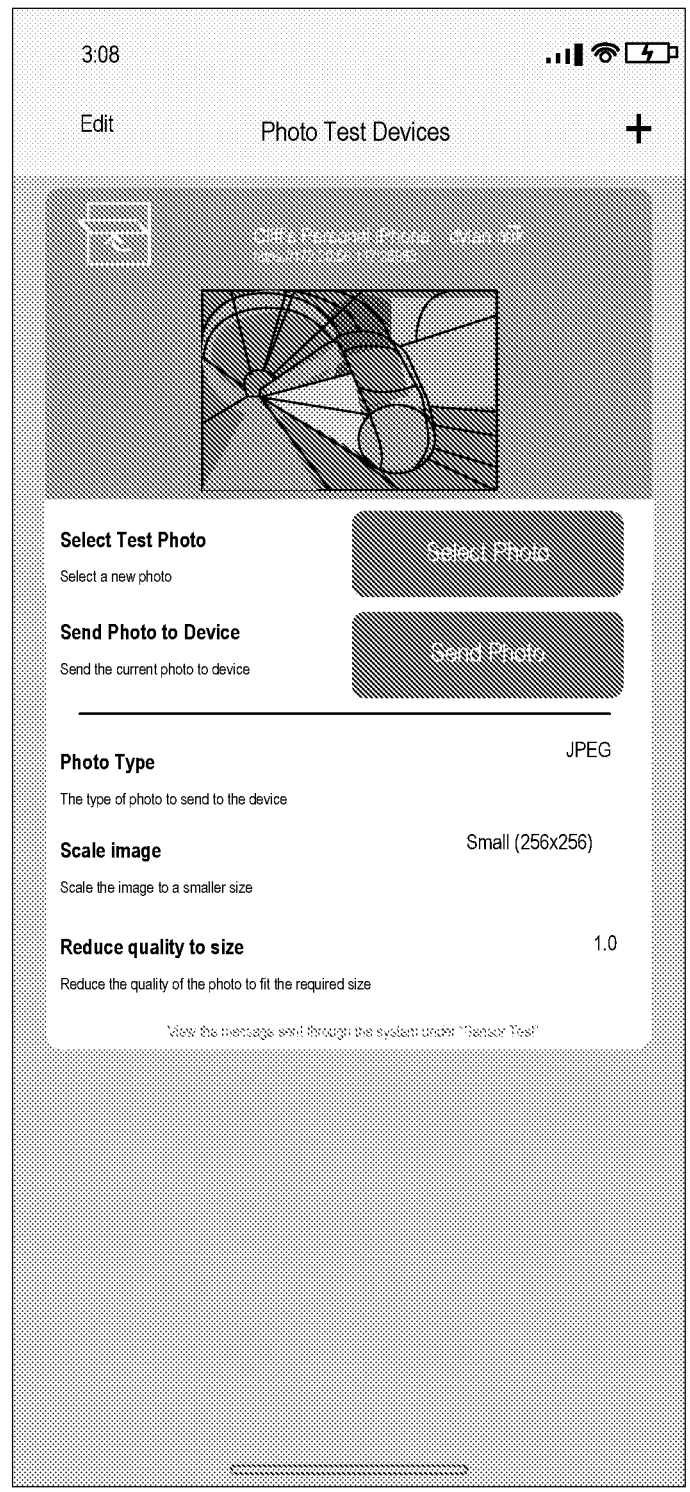
FIG. 6 illustrates an example interface for transmitting imagery to the device to be configured, in accordance with an example implementation.

In an example implementation as illustrated in FIGS. 5-7, processor 301 can provide through the first connection, the sensor data from the mobile device to the device to be configured by subscribing, through a chat interface, to messages provided from the device to be configured; and providing the sensor data from the mobile device to the device to be configured through the subscribed chat interface.

In an example implementation as illustrated in FIGS. 5-7, processor 301 can also provide, through the interface, the validation results based on receipt of the processing results of the sensor data through the first connection from the device to be configured to the mobile device by providing the processing results to the chat interface when the mobile device receives the processing results through the first connection; and providing an indicator on the processing results in the chat interface indicative of a validation status of the processing results.

Figure 4:
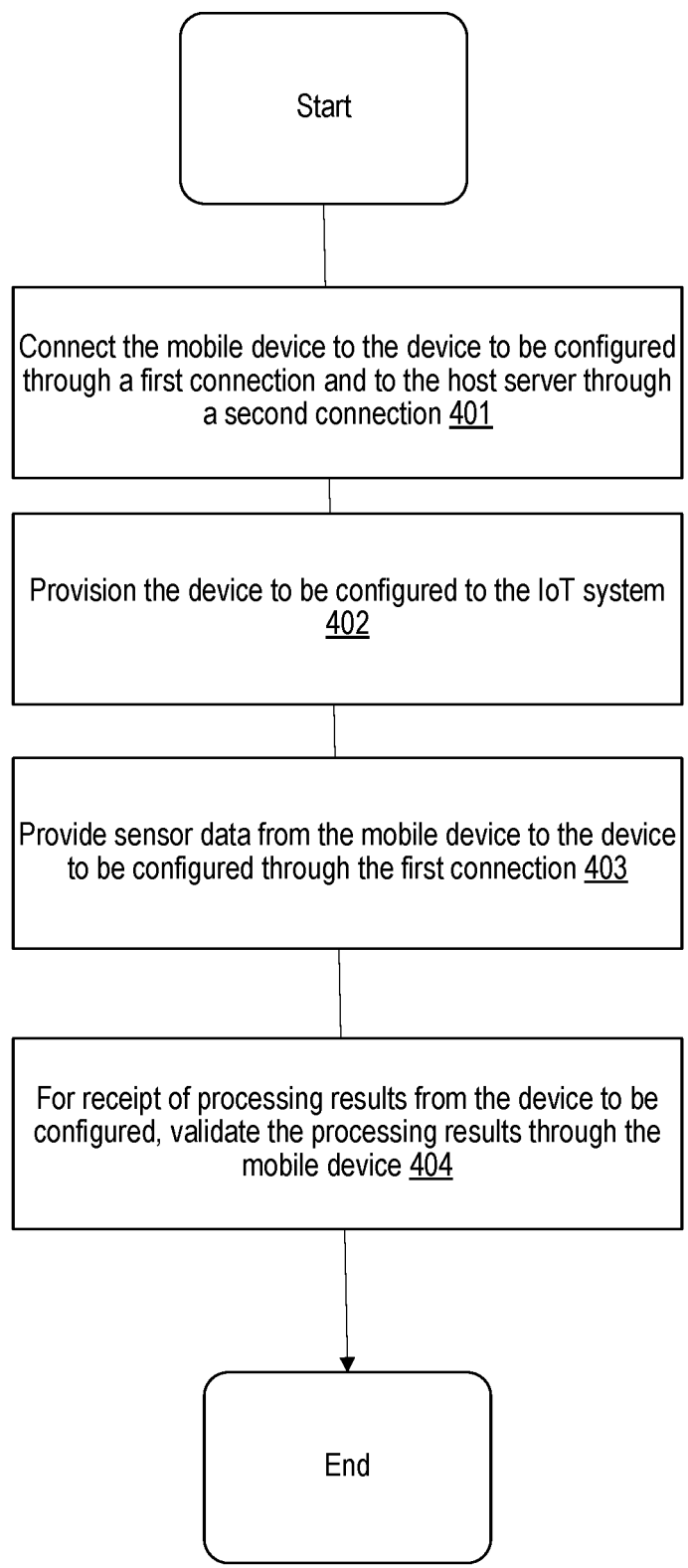
FIG. 4 illustrates an example flow for a mobile device to configure a device to be connected to an IoT system, in accordance with an example implementation.

FIG. 4 illustrates an example flow for a mobile device to configure a device to be connected to an IoT system, in accordance with an example implementation. At 401, the mobile device is connected to the device to be configured through a first connection, and to the host server through a second connection. In an example implementation, the first connection can be a Bluetooth connection to the device to be configured, and/or another communication protocol that is provided from the device to be configured (e.g., via a Quick Response (QR) code). In an example implementation, the second connection can involve a WiFi connection, cellular connection, or other connection that is separate and different from the first connection. Once connected, the mobile device can proceed to setup the connection information for the network.

At 402, the mobile device provisions the device to be configured to the IoT system. For the mobile application to provision the device, example implementations provide a state machine for the provisioning process. In the provisioning process, the mobile device provides an interface for configuring the network of the device to be configured, which can involve Ethernet and Wi-Fi configurations. The mobile device can also provide an interface for time server configuration which can allow the use of the mobile device to configure the time and network time protocol servers to be used on the device. In example implementations, the mobile device can also obtain software updates from the host server through the cellular connection and provide the software updates and configurations to the device to be configured, or it can be provided from the local memory of the mobile device depending on the desired implementation. In another example implementation, the mobile device can also provide an interface to enroll the device to be configured into a cluster such as a Kubernetes cluster so that the device to be configured can function as a worker node in the IoT system. To authenticate the device to be configured with the IoT system, the mobile device obtains an authentication token over Wi-Fi or cellular connection from the host server, and then provides the token to the device to be configured through the Bluetooth connection.

At 403, the sensor data is provided from the mobile device to the device to be configured through the first connection. After the device is provisioned, the technician utilizing the mobile application can then validate that the device works as designed. The validation tests involve utilizing the mobile device to act as a sensor for the device to be configured and provide sensor data. Such sensor data can involve, but is not limited to, accelerometer data indicating the instantaneous acceleration of the mobile device in three-dimensional space, gyroscope data indicating the instantaneous rotation around the three primary axes of the mobile device, magnetometer data indicating the orientation of the mobile device relative to the magnetic field of the Earth, and device-motion data indicating key motion-related attributes such as the user-initiated acceleration of the mobile device, its attitude, rotation rates, orientation relative to calibrated magnetic fields, and orientation relative to gravity. Once the device to be configured receives such data, the device to be configured conducts from processing and feeds the results back to the mobile device.

At 404, when processing results is received from the device to be configured, the mobile device validates that the processing results or sensor detection is working properly. The transmission can be done, for example, through a chat interface of the application as illustrated in FIG. 5.

FIG. 5 illustrates an example interface for transmitting processed results to the device to be configured and receiving validation, in accordance with an example implementation. As illustrated in the screens of FIG. 5, the left side of the chat are messages received from the device to be configured as subscribed by the mobile device, and the right side of the screens are sensor data messages posted into the device to be configured by the mobile device. If the data matches or if the processed results are what is expected from the device to be configured, then an indicator (e.g., check mark) will appear on messages received from the device to be configured as illustrated in FIG. 5.

In another example implementation for processing results from the device to be configured, the mobile device can request the host server to validate the results through the cellular connection. Such a configuration can be desirable if the IoT system administrator requires validation by the host server for the device to be configured to be connected to the IoT system, or to facilitate end-to-end validation between the IoT system and the device to be configured. In such case, the mobile device is configured to provide messages to the host server over the cellular connection regarding the sensor data that was sent to the device to be configured, and the processing results received from the server. The host server then provides an indicator over cellular to the mobile device regarding whether the processing results are validated.

Further, the camera of the mobile device can be utilized as a sensor. FIG. 6 illustrates an example interface for transmitting imagery to the device to be configured, in accordance with an example implementation. In example implementations, the mobile device can act as a camera device used in IoT for machine learning or another sensor system. The mobile device sends photos into the device to be configured and subscribes to the device to see the messages sent from the device to be configured. In an example implementation, an indicator (e.g., a checkmark) can appear next to the "Send Photo" button of the interface when the message is received on the subscribed message list.

In another example implementation, documents may also be provided to the device to be configured to test machine processing. FIG. 7 illustrates an example interface in which a document can be sent to the device to be configured, in accordance with an example implementation. An indicator (e.g., checkmark) can appear next to the "Send Document" button of the interface when the message is received on the subscribed message list as illustrated in the right screen of FIG. 7. In an example implementation, the documents can be selected from the host server and received over cellular to the mobile device to be provided to the device to be configured, in addition to sample documents provided with the mobile application itself depending on the desired implementation.

Depending on the desired implementation, other interfaces may also be provided through the mobile device application to test IoT functionality of the device to be configured. For example, such dashboards can include a Kubernetes dashboard for validating whether the device to be configured is properly connected to to Kubernetes cluster, a machine learning dashboard to indicate whether the device to be configured is properly conducting machine learning functions for data provided, and a time series graph dashboard to indicate if the device to be configured is properly receiving data at appropriate times.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

The invention claimed is:

1. A method, comprising:
connecting, through a first connection, a mobile device to a device to be configured into an Internet of Things (IoT) system, and connecting, through a second connection, the mobile device to a host server of the IoT system, the first connection and second connection being different,
provisioning the device to be configured into the IoT system;
providing, through the first connection, sensor data from the mobile device to the device to be configured; and
providing, through an interface, validation results based on receipt of processing results of the sensor data through the first connection from the device to be configured to the mobile device, wherein:
the providing, through the first connection, the sensor data from the mobile device to the device to be configured comprises:
subscribing, through a chat interface, to messages provided from the device to be configured; and
providing the sensor data from the mobile device to the device to be configured through the subscribed chat interface,
the providing, through the interface, the validation results based on receipt of the processing results of the sensor data through the first connection from the device to be configured to the mobile device comprises:
providing the processing results to the chat interface when the mobile devices receives the processing results through the first connection; and
providing an indicator on the processing results in the chat interface of a validation status of the processing results.

2. The method of claim 1, wherein the first connection is a Bluetooth connection and the second connection is a cellular connection, wherein the provisioning the device to be configured comprises:
obtaining, by the mobile device, an authentication token from the host server through the cellular connection, and
providing the authentication token to the device to be configured through the Bluetooth connection to connect the device to be configured to the IoT system.

3. The method of claim 1, wherein the providing, through the first connection,
the sensor data from the mobile device to the device to be configured further comprises generating the sensor data in real time from one or more sensors of the mobile device, the sensor data involving at least one of accelerometer data, camera images, gyroscope data, magnetometer data, and device-motion data.

4. The method of claim 1, further comprising:
obtaining one or more documents from the host server through the second connection;
providing the one or more documents through the first connection to the device to be configured; and
providing, through an interface, validation results based on receipt of processing results of the one or more documents through the first connection from the device to be configured to the mobile device.

5. A computer program, storing instructions for executing a process, the instructions comprising:
connecting, through a first connection, a mobile device to a device to be configured into an Internet of Things (IoT) system, and connecting, through a second connection, the mobile device to a host server of the IoT system, the first connection and second connection being different,
provisioning the device to be configured into the IoT system;
providing, through the first connection, sensor data from the mobile device to the device to be configured; and
providing, through an interface, validation results based on receipt of processing results of the sensor data through the first connection from the device to be configured to the mobile device, wherein:
the providing, through the first connection, the sensor data from the mobile device to the device to be configured comprises:
subscribing, through a chat interface, to messages provided from the device to be configured; and providing the sensor data from the mobile device to the device to be configured through the subscribed chat interface, the providing, through the interface, the validation results based on receipt of the processing results of the sensor data through the first connection from the device to be configured to the mobile device comprises:

providing the processing results to the chat interface when the mobile device receives the processing results through the first connection; and providing an indicator on the processing results in the chat interface indicative of a validation status of the processing results.

6. The computer program of claim 5, wherein the first connection is a Bluetooth connection and the second connection is a cellular connection, wherein the provisioning the device to be configured comprises:

obtaining, by the mobile device, an authentication token from the host server through the cellular connection, and providing the authentication token to the device to be configured through the Bluetooth connection to connect the device to be configured to the IoT system.

7. The computer program of claim 5, wherein the providing, through the first connection, the sensor data from the mobile device to the device to be configured further comprises generating the sensor data in real time from one or more sensors of the mobile device, the sensor data involving at least one of accelerometer data, camera images, gyroscope data, magnetometer data, and device-motion data.

8. The computer program of claim 5, the instructions further comprising:

obtaining one or more documents from the host server through the second connection;

providing the one or more documents through the first connection to the device to be configured; and providing, through an interface, validation results based on receipt of processing results of the one or more documents through the first connection from the device to be configured to the mobile device.

9. A mobile device, comprising:

a processor, configured to:

connect, through a first connection, to a device to be configured into an Internet of Things (IoT) system, and connect, through a second connection, to a host server of the IoT system, the first connection and second connection being different, provision the device to be configured into the IoT system;

provide, through the first connection, sensor data to the device to be configured; and provide, through an interface, validation results based on receipt of processing results of the sensor data through the first connection from the device to be configured, wherein:

the provide, through the first connection, the sensor data to the device to be configured comprises:

subscribe, through a chat interface, to messages provided from the device to be configured; and provide the sensor data to the device to be configured through the subscribed chat interface, the provide, through the interface, the validation results based on the receipt of the processing results of the sensor data through the first connection from the device to be configured comprises:

provide the processing results to the chat interface when the processing results are received through the first connection; and provide an indicator on the processing results in the chat interface indicative of a validation status of the processing results.

10. The mobile device of claim 9, further comprising one or more sensors:

wherein the processor is configured to provide, through the first connection, the sensor data to the device to be configured by generating the sensor data in real time from the one or more sensors, the sensor data involving at least one of accelerometer data, camera images, gyroscope data, magnetometer data, and device-motion data.

* * * * *